No. 736,669. PATENTED AUG. 18, 1903.
T. J. ZOELLER.
METHOD OF CLEANING FILTERS.
APPLICATION FILED JUNE 7, 1901.
NO MODEL.
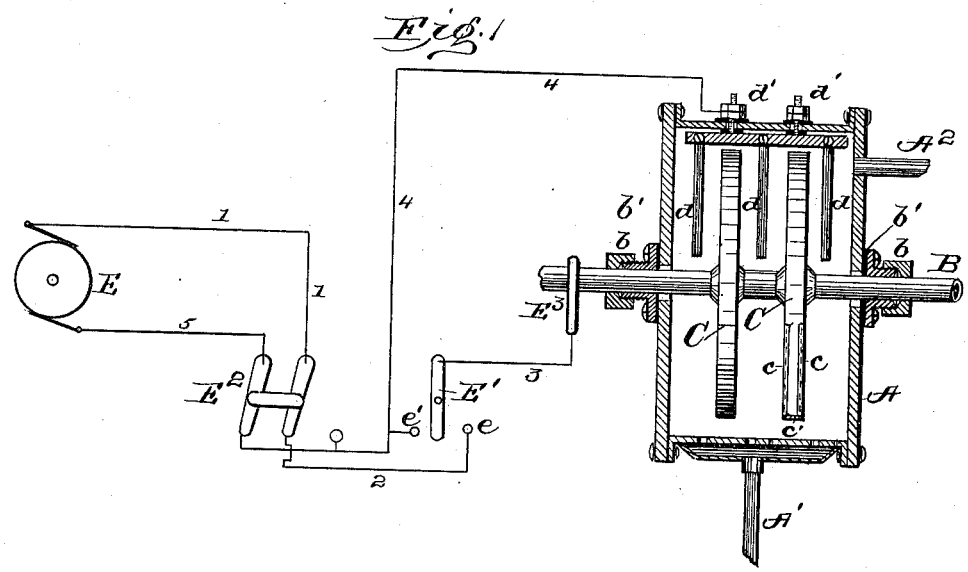
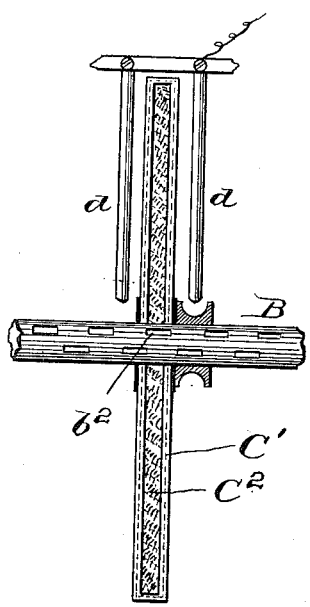
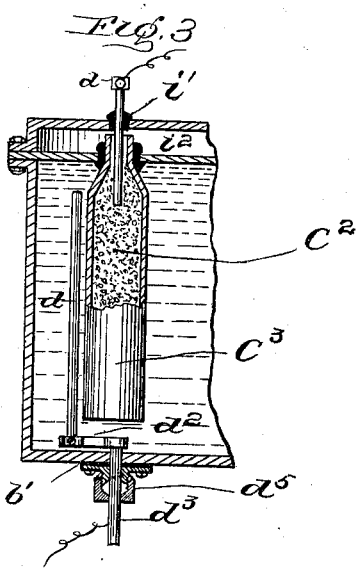
Witnesses:
J. M. Fowler Jr.
M. Darby
Inventor
Theodore J. Zoeller
by F. W. Ritter Jr.
Atty.

No. 736,669. Patented August 18, 1903.

UNITED STATES PATENT OFFICE.

THEODORE J. ZOELLER, OF NASHVILLE, TENNESSEE.

METHOD OF CLEANING FILTERS.

SPECIFICATION forming part of Letters Patent No. 736,669, dated August 18, 1903.

Application filed June 7, 1901. Serial No. 63,560. (No specimens.)

*To all whom it may concern:*

Be it known that I, THEODORE J. ZOELLER, a citizen of the United States, residing at Nashville, in the county of Davidson and State of Tennessee, have invented certain new and useful Improvements in Methods of Cleaning Filters; and I hereby declare the following to be a full, clear, and exact description of the same, such as will enable others skilled in the art to apply my invention.

My invention has for its object the removal from porous filter plates or beds of the silt and similar deposits which accumulate thereon during the filtering process and also the purification of the porous plates or filtering medium.

To this end the main feature of my invention embraces the passage of an electric current through the porous filtering medium in the presence of water or equivalent fluid, whereby the formation of gases on the filter-plate beneath the deposit tends to loosen and displace the silt or other deposit thereon, and the electrolytic action causes a flow of the liquid through the filter medium which flushes the pores, repelling the foreign matter embedded therein.

In carrying out my invention I preferably first connect the positive pole of the battery or other source of electricity with the filter-plate or filter medium, so as to cause the liberation of oxygen (or the lesser volume of gas) on the surface of the filtering medium in order to loosen up the silt or like deposit and then reverse the current to cause the liberation of hydrogen, (or a larger volume of gas,) which forces off or strips the deposit from the filtering medium. Similar results are obtained by applying electricity from an alternating-current system, and the same falls within the scope of my invention, as above set forth.

In order to assist in the purification of the body of the porous filtering medium after the surface of the same has been cleansed by reversing the current, I again connect the positive pole of the battery or like source of electricity with the filtering medium to cause the liberation and occlusion of oxygen in the porous filter bed or plate, as the gas being in a nascent state it disintegrates the refuse-matter retained therein, which constitutes a further feature of my invention.

My invention, while especially applicable to that class of filters wherein the porous plate or like filtering medium is itself a conductor— as, for instance, carbon—is also applicable to porous filtering-plates, &c., which are non-conductors. In the latter case, however, the porous filtering medium will be interposed between the electrodes in such manner that the current will be compelled to pass through the filtering medium.

Furthermore, while my invention is particularly applicable to that class of filters wherein a series of filter-drums are rotatably mounted within a suitable casing, because the movement of the filtering medium with relation to the electrode insures uniform action over the whole surface of the filter drum or plate, yet the same results are more readily obtainable in some modes of construction with fixed filter plates or tubes by causing the movement of the electrode with relation to the fixed plate.

From the detail of the process here set forth it is understood that a direct current is used, yet an alternating or variable current may be applied, according to the different modes of construction, giving the desired results. Therefore any suitable generator of electricity may be employed and any construction of porous plate-drum tube-filter or body of filtering medium having surfaces whereon the silt or like deposit forms may be treated by my improved method by the exercise of ordinary mechanical skill to adapt the means to the end, and therefore I do not limit myself to any particular form of electric generator or filter, but as matter of illustration only have chosen in the accompanying drawings to show in one instance a rotary-drum filter and in another a fixed tubular filter and traveling electrode.

Referring to the drawings accompanying this specification, Figure 1 is a diagrammatic view of a dynamo and a sectional view of a rotary-drum filter, with circuit connections, switch, pole-changer, &c., one of the filter-drums being partly in section, the filter-drums being supposed to be of carbon or equivalent conducting material. Fig. 2 is an enlarged detached detail view, partly in section, of a rotary filter-drum, portions of its shaft and electrodes, the porous shell of the filter-drum being of non-conducting material and its center or core of carbon or equivalent conducting material. Fig. 3 is a sectional view of a portion of a filter, showing one of its filter-tubes of non-conducting porous material filled with granular carbon, in lieu of which the tube may have a thin lining of carbon to obtain the same results.

In the drawings, Fig. 1, A indicates the filter-casing, having the supply-pipe A' and mud-discharge or flush pipe A² (or the supply and discharge may be reversed) and journaled therein the tubular rotary shaft B, carrying the filter-drum C. The filter-drums are composed of two porous carbon plates or disks $c\ c$, sealed at their periphery by a suitable band and packing-ring $c'$, the interior of the drums C communicating with the interior of the tubular shaft through slots $b^2$, (see Fig. 2,) which tubular shaft B serves as the outlet for the filtered water.

The stuffing-boxes $b$, through which the tubular shaft B passes, are insulated from the casing A, as at $b'$, or the shaft B is otherwise suitably insulated.

Suspended within the casing A, interposed between the filter-drums C C and properly insulated from the casing A, are a series of electrodes $d\ d\ d$, of carbon or other suitable material, and said electrodes are or their supporting-frame is provided with the usual contact-nuts $d'$.

E indicates a dynamo connected with the electrodes $d\ d\ d$ and shaft B by circuit-wires provided with the switch E' and pole-changer E² or other suitable means of breaking the circuit and reversing the current at will. The direct connection between the shaft B and circuit-wires may be made by means of a strap E³ or equivalent means, which will permit the rotation of shaft B without breaking the circuit.

In case of the rotary drum shown in Fig. 2 of the drawings, wherein the outer shell C' is of a porous non-conductor and the interior plate or core C² is of carbon, the electric current will pass through the porous non-conducting shell C' to or from the electrodes $d\ d$ and the carbon plate or core C², and thence by the shaft B or contacts $d'\ d'$, as in the case of the construction shown in Fig. 1 of the drawings.

In Fig. 3, wherein a fixed porous non-conducting filter-tube C³, provided with a lining or core C², of carbon, is used, one electrode, $d$, which, as well as the filter-tube, is insulated from the casing, as indicated at $i'\ i^2$, may be introduced into the porous filter-tube, while the other electrode, $d$, is supported on a crank-arm $d^2$, attached to a shaft $d^3$, which passes through a stuffing-box $d^5$, properly insulated from the casing of the filter, and by said means the electrode $d$ is caused to travel around the porous filter-tube to expose all parts of the filtering medium to the maximum effect of the current during the cleaning process, as stated.

The detail of the process as carried out by means of the apparatus shown in Fig. 1 of the drawings will be as follows: The switch E' being on the point $e$ and the pole-changer E² being in the position shown by the full lines, the current will pass from the generator E on line 1 across switch E² to line 2, switch E', line 3, to shaft B, to filter-drum C, which are, in effect, electrodes, thence through the water to electrodes $d\ d\ d$, to line-wine 4, across to 5, to generator. The direction of the current is reversed by throwing the pole-changing switch E².

In the case of the construction shown in Figs. 2 and 3 the porous shells not being conductors the current will pass through the shells to or from the carbon cores or equivalent contained electrodes, and while in the case of Figs. 1 and 2 the filter-drums are shown as to be rotated, yet, as in the case of the fixed filter-tube, Fig. 3, (or a like construction,) the electrodes $d\ d$ are readily made movable and caused to travel slowly around or across the filter plate or tube to insure uniform action on the entire filter-surface. The connection between the source of electricity and the filter will preferably be such that the positive pole is in direct connection with the filtering medium when the current is first applied, as this will cause the liberation of oxygen on the filter-surface beneath the deposit of silt, &c., which will loosen the same over the whole surface. When this has been accomplished, the current is preferably reversed, so as to connect the negative pole directly with the filtering medium, which will cause the liberation of a much larger volume of hydrogen gas, which will force the loosened silt, &c., off the filter-surface in sheets and shreds. The manipulation of the current to secure the best results will be governed by the mechanical and electrical construction of the filter parts. After the cleaning process has been thus far completed the current may be again reversed, connecting the positive pole to the filtering medium to cause a flushing of the pores and the occlusion of oxygen, which is then in a nascent state and acts as a purifying agent. Proof that the pores of the filtering medium have been flushed can be had by applying a continuous electric current attaching the cathode or negative pole to the filtering medium, which in some forms of construction will materially increase the rapidity of filtration as though the working pressure had been increased. The electrodes and the filtering mediums during this process having occluded the gases assume the condition found in a known form of gas-battery and are under an electric tension, which can be discharged when desired by throwing the switch E' to $e'$.

Having thus described my invention, what I claim, and desire to secure by Letters Patent, is—

1. The method herein set forth for cleaning filters, which consists in subjecting the filtering medium when coated with silt or deposit to a current of electricity and in the presence of a fluid which develops a gas beneath the silt or like deposit and displaces the same from the filtering medium, substantially as specified.

2. The method herein set forth for cleaning filters, which consists in first subjecting the filtering medium when coated with silt or other deposit to a current of electricity and in the presence of a fluid which develops a gas beneath the silt or like deposit to loosen the same, and second reversing the electric current to displace the loosened deposit, substantially as specified.

3. The method herein set forth for cleaning filters which consists in first subjecting the filtering medium when coated with silt or like deposit to a current of electricity and in the presence of a fluid which develops a gas beneath and loosens up said deposit, second reversing the electric current to displace the loosened deposit, and finally applying electric currents to the filtering medium to flush the pores of the filtering medium; substantially as and for the purposes specified.

In testimony whereof I affix my signature, in presence of two witnesses, this 4th day of June, 1901.

THEODORE J. ZOELLER.

Witnesses:
KATE GREER,
CHAS. SYKES.